United States Patent [19]

Rojahn et al.

[11] 4,037,295
[45] July 26, 1977

[54] SLIDE FASTENER STRINGER

[76] Inventors: Fred H. Rojahn, 107 Jefferson Terrace, Springfield, N.J. 07081; Jose Lichtenberg, Fuente De San Pedro No. 17, Mexico City, Mexico

[21] Appl. No.: 656,397

[22] Filed: Feb. 9, 1976

[51] Int. Cl.² ............................................. A44B 19/14
[52] U.S. Cl. ...................... 24/205.13 D; 24/205.16 R
[58] Field of Search ................................ 24/205.13 D

[56] References Cited

U.S. PATENT DOCUMENTS

| | | | |
|---|---|---|---|
| 2,252,305 | 8/1941 | Puschner | 24/205.13 D |
| 3,086,246 | 4/1963 | Stone | 24/205.13 D |
| 3,732,601 | 5/1973 | Rojahn | 24/205.13 D |
| 3,772,743 | 11/1973 | Hansen | 24/205.13 D |
| 3,885,273 | 5/1975 | Heimberger | 24/205.13 D |

FOREIGN PATENT DOCUMENTS

| | | | |
|---|---|---|---|
| 871,458 | 6/1961 | United Kingdom | 24/205.13 D |
| 851,946 | 10/1960 | United Kingdom | 24/205.13 D |

*Primary Examiner*—Bernard A. Gelak
*Attorney, Agent, or Firm*—Friedman, Goodman & Teitelbaum

[57] ABSTRACT

A stringer method for making a plastic, relatively flexible stringer for a slide fastener is disclosed. The stringer blank is extruded in a relatively rigid U-shaped form and, subsequently, a plurality of longitudinally spaced, transverse slots are die cut in the stringer blank in order to provide a series of transverse, substantially parallel ladder-like portions wherein each of the ladder-like portions includes an interlocking head member. A plurality of longitudinally spaced apart seats are also formed by a die cutting step in order to define neck portions of reduced thickness about which the stitches are placed in order to secure the fabric to the stringer.

4 Claims, 7 Drawing Figures

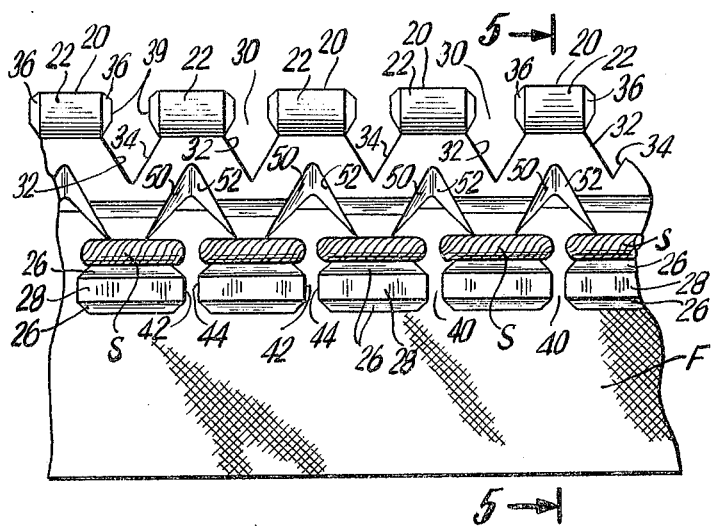
FIG. 4
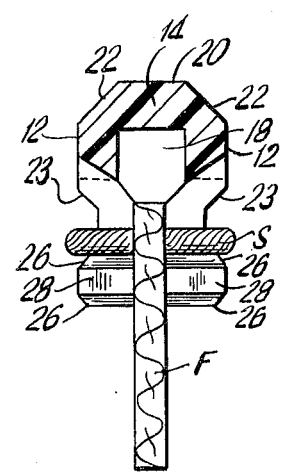
FIG. 5
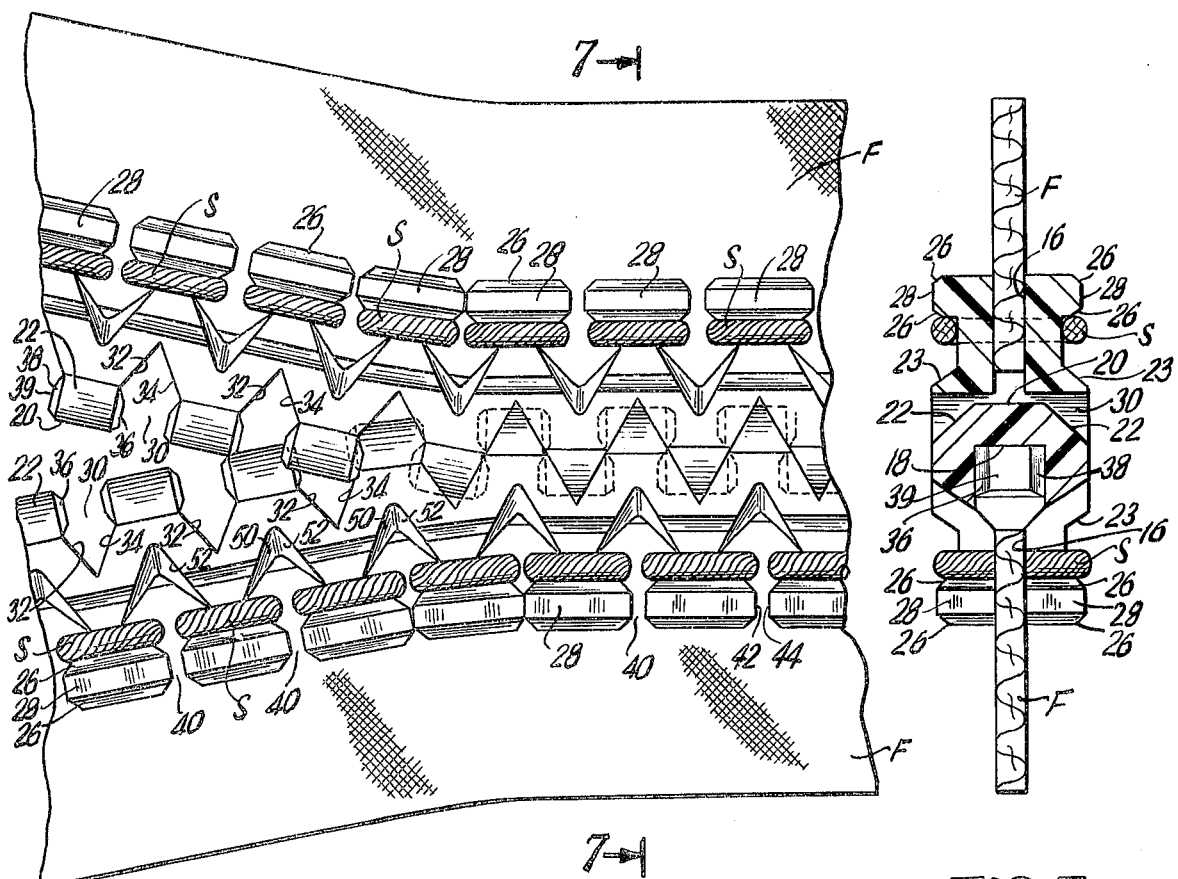
FIG. 6
FIG. 7

SLIDE FASTENER STRINGER

BACKGROUND OF THE INVENTION

Slide fasteners are well known in the art. The usual slide fastener comprises a tape provided with a plurality of metal projections disposed along a longitudinal edge thereof to define interlocking head members. These tapes are paired, wherein each mating tape is secured to an opposite side of an opening in the fabric. A slider is disposed between the tapes and acts to bring both interlocking head members together to form a closure. The above-mentioned slide fasteners are usually expensive to manufacture and are inoperable once one of the metal head members becomes disengaged from the tape.

Other forms of slide fasteners have been attempted rather than using a series of metal head members, a continuous coil has been attached to a tape to form a stringer, wherein the coil interlocks with a mating coil secured to an associated tape. Another form has been to use a continuous wire wherein the wire is bent in a serpentine fashion to define interlocking head members. In the case of both the coil and the serpentine-type wires, the effectiveness of the slide fastener depends upon the skill of the operator joining the coil and serpentine type wires to the tape, wherein such operation is critical. Furthermore, these coils and wires are usually provided with enlarged interlocking head members, wherein it has been found difficult to provide a uniform positioning and sizing of these head members with respect to themselves and to the tape. When these head members are not uniform, the slide fastener has a tendency to stick or clog or snake, making it very difficult to move the slider to the open and closed positions. From the above, it is seen that securing the coil or wire to the tape becomes a difficult operation in order to obtain a workable slide fastener. Usually a cord is secured to the tape to provide strength for the unit, wherein the cord requires additional time in the securement thereof, and increases the skill required in the operation.

A substantial improvement of the aforementioned examples of the prior art is disclosed in U.S. Pat. Nos. 3,732,601 and 3,770,862, granted to Fred H. Rojahn on May 15, 1973 and Nov. 6, 1973, respectively. In these prior U.S. patents an improved stringer blank and method for making same are disclosed.

The stringer blank disclosed in U.S. Pat. No. 3,732,601 comprises an elongated body having a pair of outwardly extending guide rib-like members that are disposed on one face thereof. The guide rib-like members are transversely spaced apart and are disposed adjacent the longitudinal edge portions of the body. First and second sets of a plurality of longitudinally, equally spaced apart slots are provided on the body with the slots extending from one longitudinal edge portion of the body to a transversely opposite, longitudinal edge portion in order to define a series of transverse, substantially parallel ladder-like ribs wherein each of the ribs is provided with a centrally located enlarged portion and a transversely spaced apart pair of abutment members that are disposed on opposite faces of the body between the pair of guide rib-like members. The first set of slots extend through one longitudinal edge portion of the body and are open on one end thereof. The second set of slots extend through the transversely opposite longitudinal edge portion of the body and is open on an opposite end thereof with the first set of slots being alternately disposed with respect to the second set of slots.

The stringer blank disclosed in the aforementioned issued U.S. Patents may be made of a heat resistant plastic material. The enlarged portion described hereinabove may also include an outwardly extending element and a recess disposed on each side of the element adjacent its base portion.

The aforementioned U.S. patents also teach a method of forming the stringer blank disclosed therein. The method taught by the U.S. patents include the steps of extruding a longitudinally extending body and simultaneously extruding a pair of outwardly longitudinally extending guide rib-like members on one side of the body as well as a pair of longitudinally extending abutment members on the opposite side of the body. The patented method also includes the step of positioning the guide rib-like members, during extrusion, in a transversely spaced apart position with each guide rib-like member being formed adjacent a longitudinal edge portion of the body. Transverse slots are then cut in the body to form a blank having a plurality of longitudinally, equally spaced apart slots that provide a series of transverse, substantially parallel ladder-like ribs.

The above method also includes the steps of providing a centrally located, enlarged portion and a transversely spaced apart pair of abutment members on each ladder-like rib and then simultaneously cutting one longitudinal edge portion and one guide rib-like member when transversely cutting a first set of the spaced slots to extend the first set of spaced slots through one longitudinal edge portion of the blank in order to provide an opening one one end of each slot of the first set. The other longitudinal edge portion and other guide rib-like member is simultaneously cut when transversely cutting a second set of spaced slots to extend the second set through the other longitudinal edge of the blank in order to provide an opening on an opposite end of each slot of the second set. The slots of the first set are alternately positioned with respect to the slots of the second set in order to provide alternating openings in the longitudinal edges of the body. Accordingly, the blank is then folded in half lengthwise and the pair of abutment members on each rib are abutted to form U-shaped projection elements each having the enlarged portion at its free end thereof and in order to define an open fabric receiving slot at an opposite end thereof.

SUMMARY OF THE INVENTION

This invention relates to slide fasteners, and more particularly to an improved relatively flexible stringer for slide fasteners that is extruded in a U-shape form. An elongated, formed strip is extruded from between dies to provide a generally rigid U-shape. During the extrusion process, transversely spaced apart slider guide means are formed on the free ends of the legs of the U-shaped stringer. A plurality of longitudinally spaced apart slots which are die cut into the stringer strip after extrusion thereof define parallel ladder-like portions and are provided with central elements that define interlocking head members. There is also provided an open slot for receiving a tape, a band or fabric to which the stringer is attached, by conventional means.

Accordingly, an object of the present invention is to provide an improved method for forming a stringer which overcomes the disadvantages of the prior art.

Another object of the present invention is to form an improved stringer by the novel method comprising this invention.

A further object of the present invention is to provide an improved stringer that is readily formed, which nevertheless is highly efficient in operation and has a relatively long trouble-free life.

A still further object of the invention is to provide a novel stringer which is flexible when secured to a fabric.

Another object of the present invention is to form a stringer than can easily be attached to a fabric, making the interlocking head members uniformly spaced with respect to each other and with respect to the fabric.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 4 is a fragmentary side elevational view illustrating an improved stringer made in accordance with the method comprising the present invention and attached to a fabric;

FIG. 5 is a sectional elevational view taken along line 5—5 of FIG. 4;

FIG. 6 is a fragmentary side elevational view illustrating the mating relationship of a pair of stringers formed in accordance with the present invention with fabric secured thereto and partially interlocked; and FIG. 7 is a sectional elevational view taken along line 7—7 of FIG. 6.

DESCRIPTION OF THE PREFERRED EMBODIMENT

Figure 1:
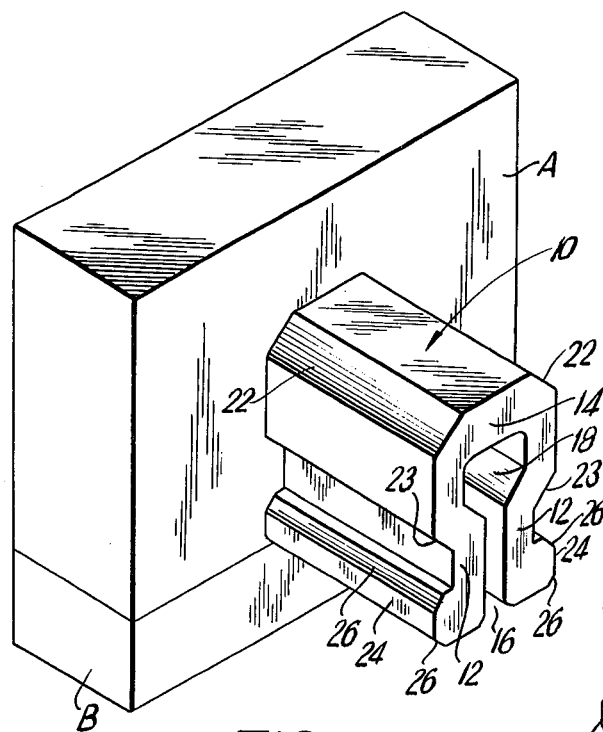
FIG. 1 represents a perspective view illustrating the extrusion step in the process of manufacture of a stringer according to the present invention.

Referring to the drawings, FIG. 1 illustrates the body of the stringer 10 being extruded from between an upper die A and a lower die B. The stringer 10 may be extruded in any preferable width or may be cut in any preferably length for association with a particular fabric F (FIGS. 4–7) for the closure of a predetermined opening thereof. The stringer 10 may be extruded from glass, styrene, nylon or any suitable relatively stiff or rigid plastic material. Preferably, the stringer 10 is formed of a heat resistant material such as Teflon so that the stringer 10 is not damaged during laundering or heat pressing thereof.

The stringer 10 is initially extruded in a relatively rigid U-shaped configuration having a pair of spaced apart legs 12 that are joined by a connecting bight or wall 14. The spacing between the legs 12 define a gap or slot 16 for receiving the fabric F. Above the slot 16, the legs 12 are spaced further apart in order to define an enlarged communicating recess or channel 18 for receiving a head member 20 of an associated stringnr 10 in a manner which will be described hereinafter. In order to minimize the size of the head member for insertion thereof between associated head members, the outside surface of the stringer 10 is extruded with chamfered longitudinally extending corners 22 and 23 at the closed end and proximate the mid-point thereof, respectively. In addition, the stringer 10 is extruded with laterally outwardly extending ribs 24 which are disposed longitudinally along the stringer 10 at the lower, open end of the legs 12. The upper and lower portions of ribs 24 are longitudinally chamfered such as designated by the reference character 26.

Figure 2:
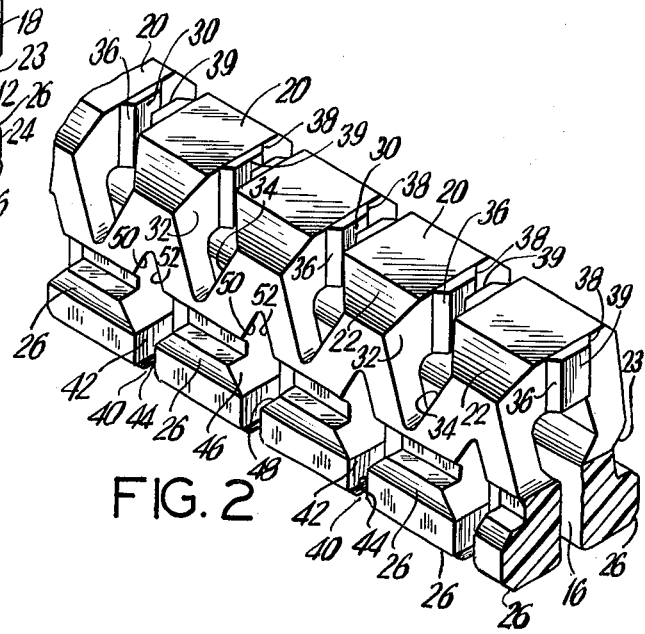
FIG. 2 represents a perspective view of an improved stringer, partially in section, made in accordance with the method comprising the present invention.
Figure 3:
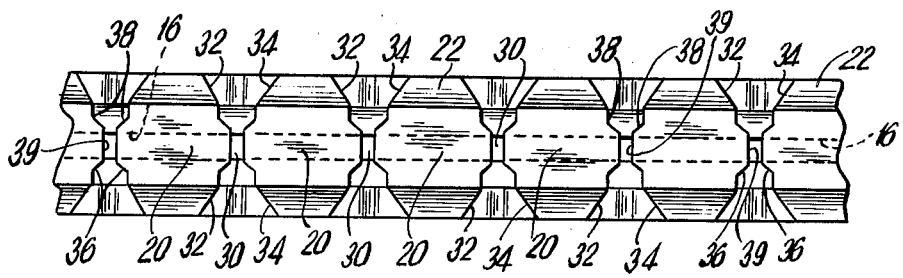
FIG. 3 is a top plan view of the improved stringer shown in FIG. 2.

Turning now to FIGS. 2 and 3, it will be seen that, in order to practice the method comprising the present invention, the stringer 10 is die cut through the bight 14 and the legs 12 in order to provide separation of the head members 20 and in order to define a line of longitudinally separated legs having bosses 28 thereon which serve as anchors for the stitches S (FIGS. 4–7). The transverse cut through the closed bight end of the stringer 10 provides a gap or slot 30 between adjacent head members 20. The slots 30 are defined by oppositely facing V-shaped walls 32 and 34 and angled surfaces 36 and 38 that define confrontingly opposed longitudinally extending tabs or teeth 39. Thus, the slots 30 provide a series of transverse, substantially parallel ladder-like portions each having a head member 20 thereon.

The bosses 28 on the legs are spaced apart by gaps or slots 40 which are defined by confrontingly opposed sidewalls 42 and 44, which at their upper end, terminate at oppositely inclined confronting surfaces 46 and 48, respectively. A pair of inclined V-shaped surfaces 50 and 52 also constitutes a portion of the slot 40 and are in opposition to inclined surfaces 46 and 48 respectively.

It will be appreciated from FIG. 2 in particular that the slots 30 at the closed bight end of the stringer 10 are in alternating relationship with the slots 40 that are formed ath the opposite open end of the stringer 10, so that the stringer is longitudinally flexible for the reasons set forth below, but the spaced apart legs 12 of each head member 20 are relatively rigid with respect to each other.

As shown in FIG. 4 and in FIG. 5, the fabric F is first inserted in the slot 16 and is sewn to the stringer 10 by means of stitches S which encircle the bosses 28. Two associated stringer 10 with their respective fabric F may then be coupled by means of a conventional slider (not shown). As shown in FIGS. 6 and 7, the slots 30 permit the head members 20 to be separated or spread apart so that the head members 20 may be positioned and blocked in the recesses 18. The tabs 39 on associated head members abut against each other to hold the lock the head members in the recesses 18 so that the associated stringers cannot be separated once they are coupled. The slots 40 permit the legs on each stringer to move relative to each adjacent leg so that the stringer can be bent as shown in FIG. 6 without breaking the stringer.

It will be appreciated from the foregoing that an improved stringer for a slide fastener has been disclosed together with an improved method for forming the stringer. The material used in fabricating the stringer is stiff enough to permit the extrusion of the stringer in a generally U-shaped transverse configuration. Subsequently, longitudinally spaced apart, alternating slots are transversely cut in the stringer at the open and closed opposite ends thereof.

By virtue of the construction defined by the improved stringer comprising the present invention the difficulties previously encountered in folding a flat extruded stringer are eliminated. That is, when the prior art stringers were folded the inherent resiliency of the material created difficulties in maintaining proper shape and alignment of the two side sections. Moreover, since the material from which the present stringer is extruded is inherently stiff, the correct alignment of the head members and the leg bosses can easily be maintained, thereby avoiding the distortion that results from bending that flat extruded stringer of the prior art. The stringer comprising the present invention provides novel, integral means for catching the thread as it is stitched so that the loops cannot move.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A stringer for a slide fastener comprising:
   an elongated body having two leg portions connected by a bight portion to define a generally U-shaped configuration in transverse cross section, said U-shaped configuration being generally rigid to maintain said leg portions in a predetermined spaced apart position relative to each other;
   a first plurality of transverse slots disposed between closed ends of said bight portion of said body to provide a plurality of longitudinally spaced apart head members;
   a second plurality of transverse slots disposed between free open ends of said leg portions of the body to provide a plurality of longitudinally spaced apart legs on each side of said head members;
   longitudinally extending groove means provided in an outside side surface of each of said legs for receiving stitches when the stringer is sewn to a fabric;
   said first and said second plurality of slots being arranged in a longitudinally alternating pattern to provide a pair of legs facing each other between adjacent head members, each leg of said pair being connected to each of said adjacent head members;
   said first plurality of slots being defined by pairs of inclined wall surfaces extending inwardly from an outside surface of said bight portion of said U-shaped body, each of said pairs of inclined wall surfaces defining a V-shaped configuration with an open end of said V-shaped wall surfaces being adjacent each other at said head members for longitudinal flexibility thereof to permit said adjacent head members to be spread apart when closing and opening the slide fastener;
   said second plurality of slots being defined by sets of inclined walls extending inwardly from an outside surface of each of said leg portions of said U-shaped body, each of said sets of inclined walls defining a V-shaped configuration with an open end of said V-shaped walls being adjacent each other at said groove means for longitudinal flexibility thereof to permit relative movement between longitudinally adjacent legs when closing and opening the slide fastener;
   said leg portions being relatively close together at said free open ends thereof to provide a longitudinally extending aperture for receiving the fabric therebetween, said leg portions being relatively widely spaced apart adjacent said closed ends of said bight portion for providing a longitudinally extending recess for receiving head members of an associated stringer, said aperture and said recess being in direct open communication with each other.

2. A stringer according to claim 1, wherein each of said legs is provided with an enlarged boss at its free end adjacent to said groove means.

3. A stringer according to claim 1, wherein said pairs of inclined wall surfaces and said sets of inclined walls are further inclined inwardly from said outside side surface of each of said legs.

4. A stringer according to claim 1, wherein said head members include tabs extending into associated slots of said first plurality of slots in a longitudinal direction.

* * * * *